(12) United States Patent
Inagawa et al.

(10) Patent No.: US 8,899,820 B2
(45) Date of Patent: Dec. 2, 2014

(54) MELTING KNEADING DEVOLATILIZING EXTRUDER

(75) Inventors: Kenji Inagawa, Hiroshima (JP); Seiji Takamoto, Hiroshima (JP); Hiroaki Shintani, Hiroshima (JP); Shigeki Inoue, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 1164 days.

(21) Appl. No.: 12/668,293

(22) PCT Filed: Jul. 9, 2008

(86) PCT No.: PCT/JP2008/062409
§ 371 (c)(1),
(2), (4) Date: Jan. 8, 2010

(87) PCT Pub. No.: WO2009/008451
PCT Pub. Date: Jan. 15, 2009

(65) Prior Publication Data
US 2010/0296360 A1    Nov. 25, 2010

(30) Foreign Application Priority Data
Jul. 9, 2007    (JP) .................... 2007-179453

(51) Int. Cl.
B29B 7/42    (2006.01)
B29B 7/84    (2006.01)
B29C 47/08    (2006.01)
B29C 47/76    (2006.01)
B29B 7/48    (2006.01)
B29C 47/60    (2006.01)
B29C 47/00    (2006.01)

(52) U.S. Cl.
CPC .............. *B29B 7/845* (2013.01); *B29C 47/0825* (2013.01); *B29C 47/767* (2013.01); *B29B 7/482* (2013.01); *B29C 47/6056* (2013.01); *B29C 47/0009* (2013.01)
USPC ............................................. 366/82; 366/90

(58) Field of Classification Search
CPC .. B29C 47/402; B29C 47/0861; B29C 47/50; B29C 47/40; B29C 47/6056; B29C 7/483; B29C 7/481
USPC .................... 366/83, 84, 82, 90, 81
See application file for complete search history.

(56) References Cited

U.S. PATENT DOCUMENTS 2,505,355 A * 4/1950 Gliss ............................... 366/87
2,631,016 A * 3/1953 De Laubarede ............... 366/145
(Continued)

FOREIGN PATENT DOCUMENTS

DE    2301906    8/1974
EP    1832407 A1    9/2007
(Continued)

OTHER PUBLICATIONS

International Search Report (PCT/ISA/210) for PCT/JP2008/062409, dated Oct. 14, 2008.
(Continued)

*Primary Examiner* — Tony G Soohoo
(74) *Attorney, Agent, or Firm* — Sughrue Mion, PLLC

(57) ABSTRACT

There is provided a melting kneading devolatilizing extruder in which the surface renewability of a molten raw material is improved.
The melting kneading devolatilizing extruder of the invention includes at least one surface renewable screw segment each including a plurality of discs that are arrayed such that a phase angle E, which is a deviation angle between the discs around an axis of a screw, is 0°<E<90° within a surface renewal region, and the surface renewable screw segment includes a void portion between the discs so that the discs are arranged at intervals in a direction of the axis of the screw.

6 Claims, 6 Drawing Sheets

(56) References Cited

U.S. PATENT DOCUMENTS

| | | | | |
|---|---|---|---|---|
| 2,676,355 A | * | 4/1954 | Pasquetti | 425/378.1 |
| 3,225,453 A | * | 12/1965 | Burner | 34/387 |
| 3,574,891 A | * | 4/1971 | Bredeson et al. | 425/192 R |
| 4,408,887 A | * | 10/1983 | Yamaoka | 366/75 |
| 4,416,544 A | * | 11/1983 | Blach | 366/85 |
| 4,940,329 A | * | 7/1990 | Dienst | 366/75 |
| 5,044,757 A | * | 9/1991 | Dienst | 366/76.6 |
| 5,255,973 A | * | 10/1993 | Nogossek | 366/85 |
| 5,362,146 A | * | 11/1994 | Nogossek | 366/82 |
| 5,593,227 A | * | 1/1997 | Scheuring et al. | 366/82 |
| 5,728,337 A | * | 3/1998 | Yoshikawa et al. | 264/102 |
| 5,851,065 A | * | 12/1998 | Ikeda et al. | 366/76.6 |
| 6,116,770 A | * | 9/2000 | Kiani et al. | 366/82 |
| 6,241,375 B1 | | 6/2001 | Wang | |
| 7,270,471 B2 | * | 9/2007 | Blach | 366/85 |
| 2005/0013192 A1 | * | 1/2005 | Kakizaki et al. | 366/82 |
| 2005/0041521 A1 | | 2/2005 | Herter | |
| 2005/0084559 A1 | * | 4/2005 | Blach | 425/208 |
| 2006/0003042 A1 | | 1/2006 | Inoue et al. | |
| 2006/0269640 A1 | | 11/2006 | Yasusaka et al. | |
| 2007/0177451 A1 | * | 8/2007 | Benjamin et al. | 366/82 |
| 2009/0202669 A1 | * | 8/2009 | Tomiyama et al. | 425/143 |
| 2010/0296360 A1 | * | 11/2010 | Inagawa et al. | 366/83 |
| 2014/0087060 A1 | * | 3/2014 | Kessler et al. | 366/82 |

FOREIGN PATENT DOCUMENTS

| | | |
|---|---|---|
| GB | 1347294 | 2/1974 |
| JP | 06-055611 A | 3/1994 |
| JP | 08-267539 A | 10/1996 |
| JP | 10-080685 A | 3/1998 |
| JP | 10-310647 A | 11/1998 |
| JP | 11-277604 A | 10/1999 |
| JP | 2003-127133 A | 5/2003 |
| JP | 2004-090272 A | 3/2004 |
| JP | 2004-306547 A | 11/2004 |
| JP | 2006-001252 A | 1/2006 |
| JP | 3857411 B2 | 9/2006 |

OTHER PUBLICATIONS

Written Opinion (PCT/ISA/237) for PCT/JP2008/062409, dated Oct. 14, 2008.

Communication from the European Patent Office issued Mar. 22, 2013 in counterpart European Application No. 08790996.6.

Office Action dated Oct. 28, 2013 issued by the European Patent Office in counterpart European Patent Application No. 08 790 996.6, 4 pages.

* cited by examiner

MELTING KNEADING DEVOLATILIZING EXTRUDER

TECHNICAL FIELD

The present invention relates to a melting kneading devolatilizing extruder for a resin raw material.

BACKGROUND ART

Hitherto, melting kneading devolatilizing extruders for a resin raw material are disclosed in, for example, Patent Literature 1 and Patent Literature 2.

Patent Literature 1 discloses a configuration in which a kneading portion and a devolatilizing portion are alternately provided in a plurality of places, a vacuum state is brought about in the devolatilizing portion, and devolatilization is performed by transporting and kneading of a screw in the devolatilizing portion.

On the other hand, similarly to Patent Literature 1, Patent Literature 2 discloses an apparatus, which has a kneading flight twisted so that a raw material can be transferred to the downstream, in a devolatilization region where air-tightness is maintained in a filling portion by a raw material, and which kneads the material to separate a volatile component while the material is fed the downstream. The apparatus disclosed in Patent Literature 2 is shown in FIG. 11. The extruder has a rotatable screw 102 within a cylinder 101 including a vacuum vent 103 which sucks an inside of the cylinder into a negative pressure state. The raw material supplied into the extruder is transported to the kneading portion 104 by a screw inserted into the cylinder 101, is melted in the kneading portion 104 while a shearing force is added thereto, and is transported to the downstream. In the devolatilization region 105 which is brought into a negative pressure state as air is sucked through from the vacuum vent 103, a volatile component contained in the molten raw material is separated from the molten raw material and is removed from the extruder.

In Patent Literature 2, it is reported that the volatile component contained can be more efficiently removed by installing a screw segment 106 having surface renewability (allowing a molten raw material which is not exposed to ambient air to be exposed to ambient air when a raw material is kneaded), in the devolatilization region 105 where air-tightness is maintained, and by transporting the raw material to the downstream while kneading the raw material. A front view of the screw segment of Patent Literature 2 which has surface renewability is shown in FIG. 12(a), and a side view thereof is shown in FIG. 12(b). The screw segment 106 is composed of two rotor blade segments having a pair of kneading flights which protrude in mutually opposite directions in a radial direction, and the screw segment 106 has a lower tip portion 107 with large tip clearance with the inner wall of the cylinder and a high tip portion 108 with small tip clearance. By forming a thin film of a raw material on the inner wall of the cylinder in the lower tip portion 107, and by scraping off the thin film formed by the high tip portion 108, it is possible to repeatedly perform surface renewal to more effectively promote devolatilization.

Patent Literature 1: Japanese Patent No. 3857411
Patent Literature 2: JP-A-2006-1252

DISCLOSURE OF THE INVENTION

Problems that the Invention is to Solve

A devolatilizing method disclosed in Patent Literature 1 makes a portion of resin flow back in a meshing portion between both screws which exist in the devolatilizing portion, earns residence time, and performs devolatilization. In the method according to this Patent Literature 1, in order to promote devolatilization, expansion of the exposure area of resin to be devolatilized as well as the residence time becomes necessary. However, since the transport capacity is high in a transport screw in which flights are connected together, the surface renewability may become insufficient.

On the other hand, in the devolatilizing apparatus disclosed in Patent Literature 2, it is considered to arrange kneading flights twisted so that a raw material can be transported to the downstream side in the devolatilization region, and to expand the exposure area of resin to be devolatilized while being kneaded. However, similarly to the method disclosed in Patent Literature 1, this apparatus has flights which are connected together, and therefore, the transport capacity is high. Thus, the surface renewability will degrade. Hence, unless many kneading flights are arranged to lengthen the devolatilization region, there will be cases where sufficient devolatilization effects are not obtained.

Therefore, an object of the invention is to provide a melting kneading devolatilizing extruder in which the surface renewability of the molten raw material is improved.

Means for Solving the Problems

In order to achieve the above object, the melting kneading devolatilizing extruder of the invention is a melting kneading devolatilizing extruder, in which two screws are rotatably inserted into a cylinder capable of being heated and cooled, each screw is composed of, sequentially from an upstream side that is a supply side for a resin material, an upstream seal portion allowing the resin raw material to be supplied thereto from the outside and allowing the resin raw material to be filled thereinto, a devolatilization region where the resin raw material is devolatilized, a downstream seal portion allowing the resin raw material to be filled thereinto, the devolatilization region includes a surface renewal region, which allows the resin raw material to be kneaded therein, and which allows an inner part of the resin raw material that is not exposed to ambient air to be exposed to ambient air. Here, in the surface renewal region, at least one surface renewable screw segment each including a plurality of discs which are arrayed such that a phase angle E, which is a deviation angle between the discs around an axis of the screw, is $0°<E<90°$ is provided, and the surface renewable screw segment includes a void portion between the discs so that the discs are arranged at intervals in a direction of the axis of the screw.

In the melting kneading devolatilizing extruder of the invention described above, the void portion is provided between the discs so that the resin raw material stagnates in the surface renewable screw segment without being transported in the void portion. Since this increases the number of times of surface renewal performed at the tip portion of the disc, devolatilization characteristics can be improved. Additionally, the surface renewable screw segment of the invention with improved devolatilization characteristics can be prevented from becoming long unlike a related-art technique.

Additionally, an outer peripheral surface of the void portion of the melting kneading devolatilizing extruder of the invention may be parallel to an inner peripheral surface of the cylinder. This can reliably eliminate the transport capacity of the resin raw material in the void portion.

Additionally, in the melting kneading devolatilizing extruder of the invention, a spiral angle θ, which is an angle between a top a on the side of a front face of the disc and a top b on the side of a rear face of the disc at a tip portion that is a tip portion of the disc, is within a range of 0°≤θ<90° in an anti-rotational direction of the screw when a cross-section of the disc having the axis of the screw as a normal line is seen in a direction of an axial tip. In this case, the devolatilization performance can be improved by suppressing the superfluous stagnation in the surface renewable screw segment.

Additionally, in the melting kneading devolatilizing extruder of the invention, the upstream seal portion may include a kneading screw segment and a seal ring in order to knead the resin raw material, to raise the temperature of the resin raw material, and to form a resin seal, and the surface renewal region may be arranged immediately after a downstream of the upstream seal portion. In this case, the devolatilization performance can be improved more than a configuration in which a screw which has the capability of conveying the resin raw material between the kneading portion and the surface renewable screw segment is arranged.

Advantage of the Invention

According to the invention, the phase angle can be given around the axis of the screw, and the resin raw material can be caused to stagnate by the surface renewable screw segment including a plurality of discs in which the void portions are provided and arranged in the axial direction of the screw. Thus, the number of times of surface renewal of the resin raw material can be increased, and the devolatilization characteristics can be improved.

DESCRIPTION OF REFERENCE NUMERALS

1: MELTING KNEADING DEVOLATILIZING EXTRUDER
9: SURFACE RENEWABLE SCREW SEGMENT
10: DISC
11: VOID PORTION
12: TIP PORTION
13: CYLINDER
14: SCREW
15: VACUUM VENT
16: DEVOLATILIZATION REGION
17a: UPSTREAM SEAL PORTION
17a1: SCREW SEGMENT
17a2: KNEADING PORTION
17b: DOWNSTREAM SEAL PORTION
18: SURFACE RENEWAL REGION

BEST MODE FOR CARRYING OUT THE INVENTION

Figure 1:
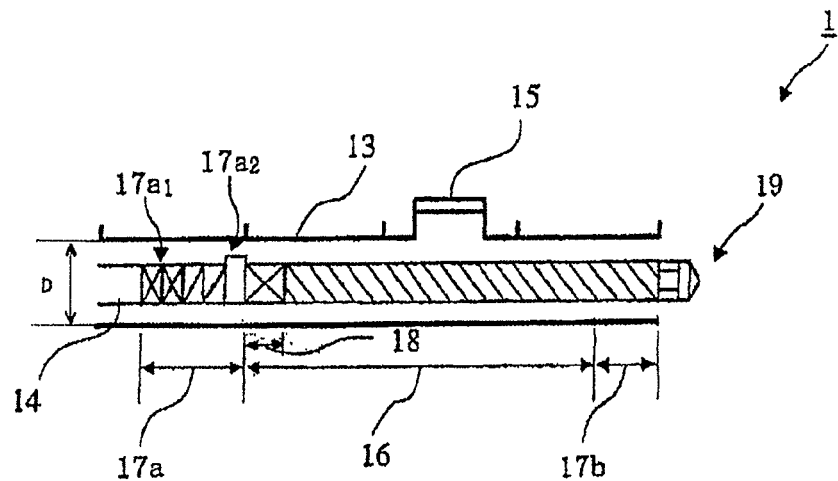
FIG. 1 is a schematic view for explaining the structure of a melting kneading devolatilizing extruder of the invention.

FIG. 1 is a schematic view for explaining the structure of a melting kneading devolatilizing extruder of the invention. Incidentally, in the following description, the left side of FIG. 1 is called the upstream, and the right side of FIG. 1 is called the downstream.

Figure 2:
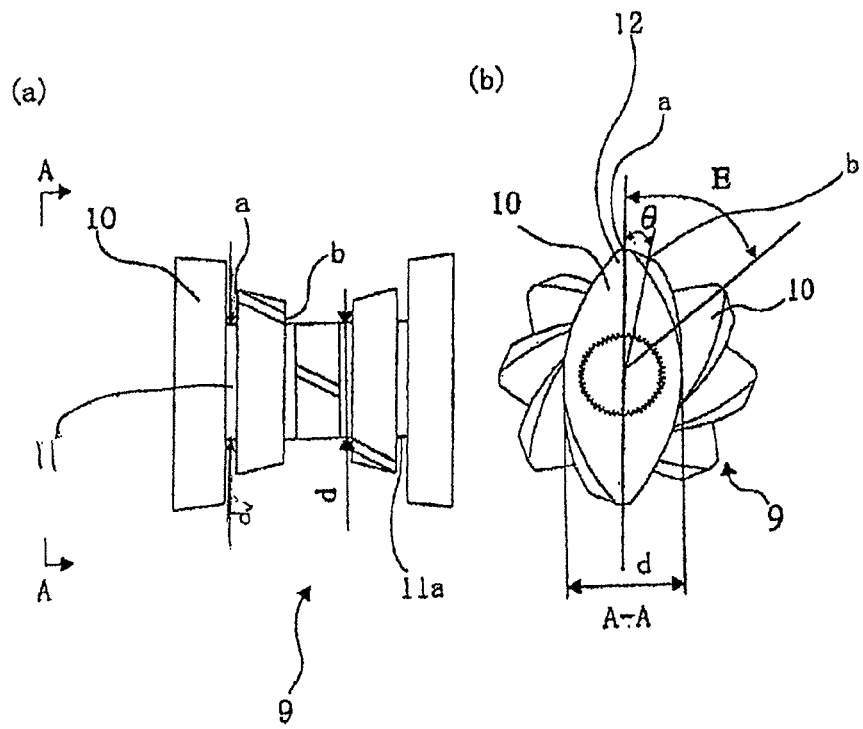
FIGS. 2(a) and 2(b) are views showing a surface renewable screw segment of the invention.

FIGS. 2(a) and 2(b) are views showing a surface renewable screw segment of the invention, FIG. 2(a) is a side view, and FIG. 2(b) is a sectional view of the surface renewable screw segment in the direction of a line A-A shown in FIG. 2(a). Incidentally, FIG. 2(b) is a cross-section of the surface renewable screw segment having the axis of a screw 14 as a normal line and seen in the direction of an axial tip (the right direction of FIG. 1) of a screw 14.

The melting kneading devolatilizing extruder 1 has two screws 14, which are rotatably housed within a cylinder 13 that can be heated and cooled, and which mesh with each other. A resin raw material supply port (not shown) is provided on the upstream of the cylinder 13, and a resin raw material is supplied into the cylinder 13 via a hopper (not shown) connected to the resin raw material supply port. Additionally, a vacuum vent 15 for vacuum suction for bringing the inside of the cylinder 13 into a reduced pressure state by vacuuming and for removing, i.e., devolatilizing a volatile component and moisture from a resin raw material is provided on the downstream of the cylinder 13.

The screw 14 is connected to a speed reducer (not shown) and is rotationally driven by a motor (not shown) connected to the speed reducer in the same direction. The screw 14 is composed of an upstream seal portion 17a, a devolatilization region 16 and a downstream seal portion 17b from the upstream.

The upstream seal portion 17a is a region, from which the resin raw material supplied from the resin material supply port is fed to the downstream while being kneaded. The upstream seal portion 17a is composed of a kneading screw segment and a seal ring in order to knead the resin raw material, raise the temperature of the resin raw material, and form a resin seal.

The devolatilization region 16 is a region, in which the resin raw material fed from the upstream seal portion 17a is kneaded, and in which a volatile component included in the resin raw material is separated from a molten resin raw material and is removed from the extruder. The surface renewal region 18 is provided at the portion of the devolatilization region 16 on the side of the upstream seal portion 17a. The surface renewal region 18 is a region for allowing the resin raw material to be kneaded therein, thereby allowing an inner part of the molten resin raw material which is not exposed to ambient air to be exposed to ambient air. A surface renewable screw segment 9 is provided in this region.

A die (not shown) is provided at the most downstream portion of the downstream seal portion 17b. At the downstream seal portion 17b, the kneaded material becomes dense, and the molten resin raw material becomes full.

As described above, as the resin raw material becomes full at the upstream seal portion 17a and the downstream seal portion 17b, air-tightness is maintained, and the devolatilization region 16 is brought into a negative pressure state.

Next, the configuration of the surface renewable screw segment 9 arranged in the surface renewal region 18 will be described.

The surface renewable screw segment 9 is composed of five discs 10 arrayed via void portions 11. That is, the discs 10 are arranged at intervals in the axial direction of the screw 14 as a void portion 11 is sandwiched between the discs 10.

Each disc 10 is a TKD (twist kneading disc), and a spiral angle θ that is an angle between a top a on the side of a front face and a top b on the side of a rear face at a tip portion 12 that is a tip portion of the disc 10 inclines at about 11° in an anti-rotational direction of the screw 14 when a cross-section A-A of the disc 10 is seen in a anti-rotational direction of an axial tip. Additionally, a phase angle E that is a deviation angle between the discs 10 around the axis of the screw 14 is 45°.

Incidentally, the spiral angle θ can be suitably selected within a range of 0°≤θ<90° in the anti-rotational direction of the screw 14 when a cross-section of the disc 10 having the axis of the screw 14 as a normal line is seen in the direction of the axial tip. That is, not only the TKD in which the spiral angle θ is set to 0°<θ<90°, but also an FK (Forward Kneading Disc) in which the spiral angle θ is 0° is applicable as the disc 10. However, in order to suppress superfluous stagnation of the resin raw material in the surface renewable screw segment 9, it is preferable to set the spiral angle θ to 0°<θ<90°.

Additionally, the phase angle E can be suitably selected within a range of 0°<E<90°, and a number of the discs 10 may be set to, for example, 6 or more and 15 or less. Incidentally, the number of the discs 10 is not limited to this.

Each void portion 11 is a ring-shaped member, and an external diameter $d_v$ thereof is equal to or less than the short diameter d of the discs 10 although not particularly limited. Additionally, in order not to give the transport capability of the resin raw material to the void portion 11, it is preferable to make an outer peripheral surface 11a of the void portion 11 parallel to the inner peripheral surface of the cylinder 13.

In the surface renewable screw segment 9, a disc 10 having the spiral angle θ is arrayed at the phase angle E to its adjacent disc 10. Additionally, since the void portion 11 does not have transport capacity, the residence time of the molten resin raw material in the devolatilization region 16 can be further lengthened. That is, by adopting the surface renewable screw 9 of the invention in the devolatilization region, it is possible to promote expansion of the exposure area resulting from an increase in the number of times of renewal of the surface of the resin raw material, and it is possible to obtain high devolatilization effects with short L/D (L=Length of Screw segment, and D=Cylinder bore). Specifically, an individual one of the void portions of the surface renewable screw segment 9 is preferably set to L/D=0.02 or less, and set to L/D=0.015 in this embodiment, wherein $L_{11}$ is the length of the individual one of the void portions and D is the diameter of the cylinder bore (see FIGS. 1 and 9(a)).

Incidentally, it is preferable to arrange the surface renewable screw segment 9 immediately after the kneading portion of the upstream seal portion 17a.

Next, the devolatilizing operation of the devolatilization region in the melting kneading devolatilizing extruder of the invention will be described.

The volatile component of the molten resin raw material is removed in the devolatilization region. In the surface renewable screw segment 9 arranged in the devolatilization region, in the disc 10, a thin film is formed while the surface of the resin raw material is renewed, and removal of the volatile component of the resin raw material surface is promoted. Since there is no transport capacity in the void portion 11, the resin raw material stagnates in the surface renewable screw segment 9. Since this increases the number of times of surface renewal performed at the tip portion 12 of the disc 10, devolatilization can be more effectively promoted. However, when the resin raw material becomes excessively full within the cylinder 13, the area of the resin raw material exposed to a pressure reduced atmosphere will decrease, and devolatilization efficiency will be lowered. For this reason, by inclining the tip portion 12 of a disc 10 at a spiral angle 0°≤θ<90° in the axial direction to add transport capacity, the exposure area is increased without making the resin raw material excessively full within the cylinder 13, and the devolatilization efficiency is improved. The volatile component is vacuum-sucked through from the vacuum vent 15.

The results of comparative tests of devolatilization performance which are performed using melting kneading devolatilizing extruders having a general screw configuration, and the screw configuration including the surface renewable screw segment 9 of the invention are shown below. Incidentally, the respective tests were performed under the following conditions.

Resin raw material: LDPE (low-viscosity polyethylene),
MI(Melt Index)=2 Contained volatile component: n-Hex (normal hexane), 3000 ppm,
Cylinder bore: 69 φmm
Processing capacity: 150 to 250 kg/h
Screw rotating speed: 100 to 250 rpm
(Screw-1)

Figure 3:
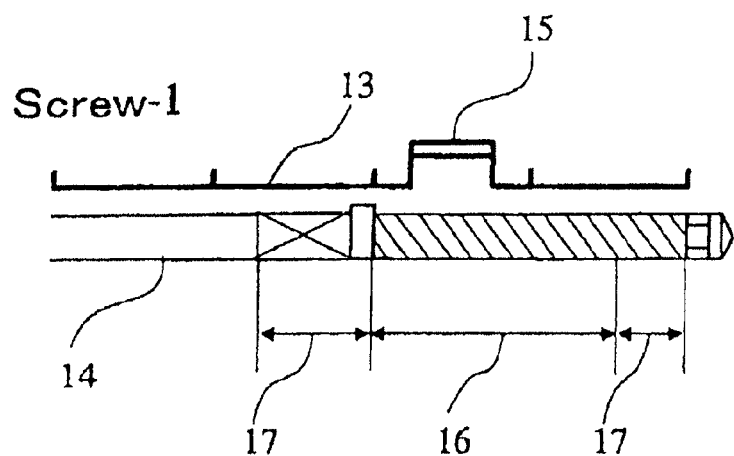
FIG. 3 is a schematic view showing the configuration of Screw-1 used for a devolatilization performance test.

Screw-1 shown in FIG. 3 has a general screw configuration, which does not use the surface renewable screw segment 9 of the invention in the devolatilization region 16, and which is composed of only a screw segment (FF: Forward Full-flight screw) having high transport capacity to the downstream.

(Screw-2)

Figure 4:
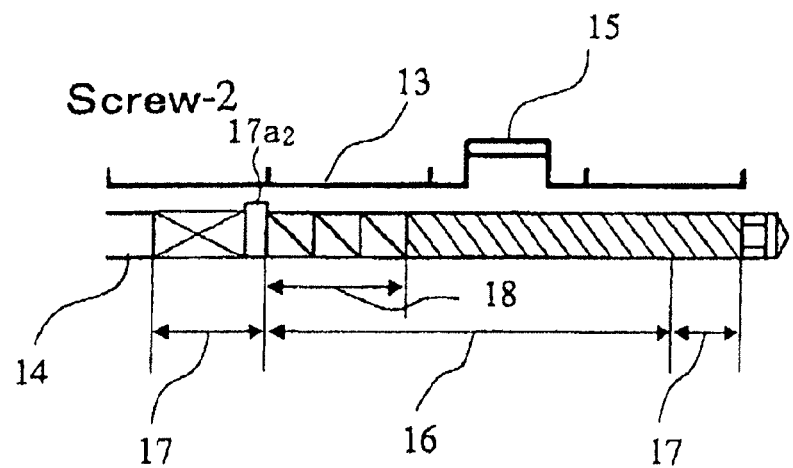
FIG. 4 is a schematic view showing the configuration of Screw-2 used for a devolatilization performance test.
Figure 8:
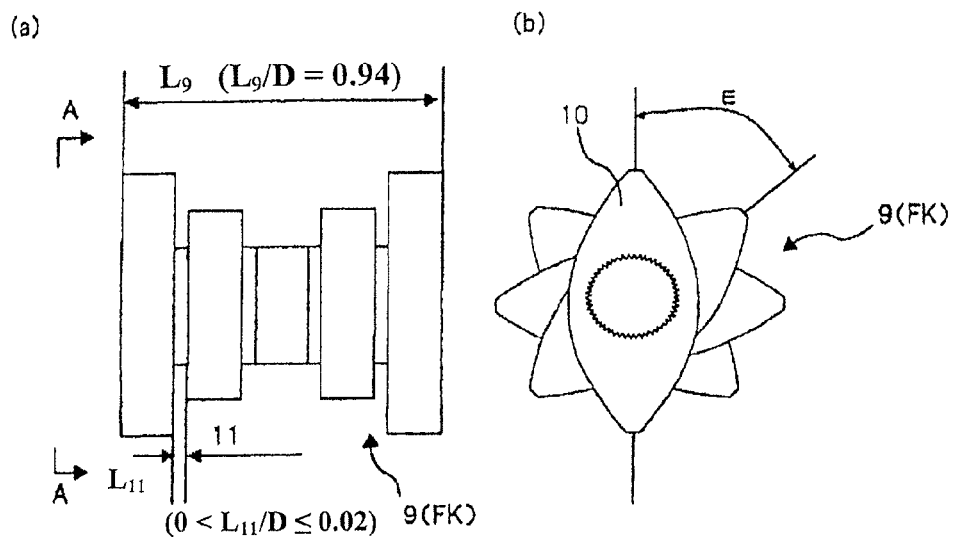
FIGS. 8(a) and 8(b) are views showing a surface renewable screw (FK) used for Screw-2.

Screw-2 shown in FIG. 4 has a screw configuration including the surface renewable screw segment 9 of the invention in the devolatilization region 16. In Screw-2, a surface renewable screw segment 9 (FK) with a spiral angle θ=0° and a phase angle E=45° is arranged in the surface renewal region 18 immediately downstream of the kneading portion 17a2 of the upstream seal portion 17a. The surface renewable screw segment 9 (FK) used in Screw-2 is shown in FIG. 8. FIG. 8(a) is a side view of the surface renewable screw segment 9 (FK), and FIG. 8(b) is a sectional view of the surface renewable screw segment in the direction of a line A-A shown in FIG. 8(a). As illustrated in FIG. 8(a), a length $L_9$ is the length of a surface renewable screw segment 9, and the ratio of the length $L_9$ to the diameter D of the cylinder bore is $L_9/D$=0.94.

In Screw-2, three renewable screw segments 9 (FK) are arranged so as to be continuously connected together. For this reason, as for the total length of the extruder, the extruder extends by 3.5 D of the configuration of Screw-1.

(Screw-3)

Figure 5:
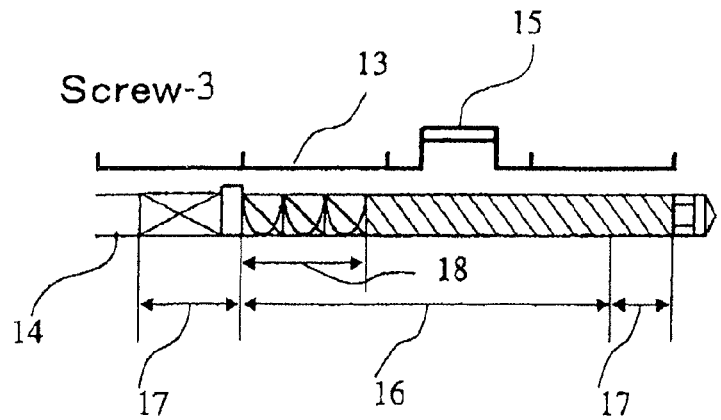
FIG. 5 is a schematic view showing the configuration of Screw-3 used for a devolatilization performance test.
Figure 9:
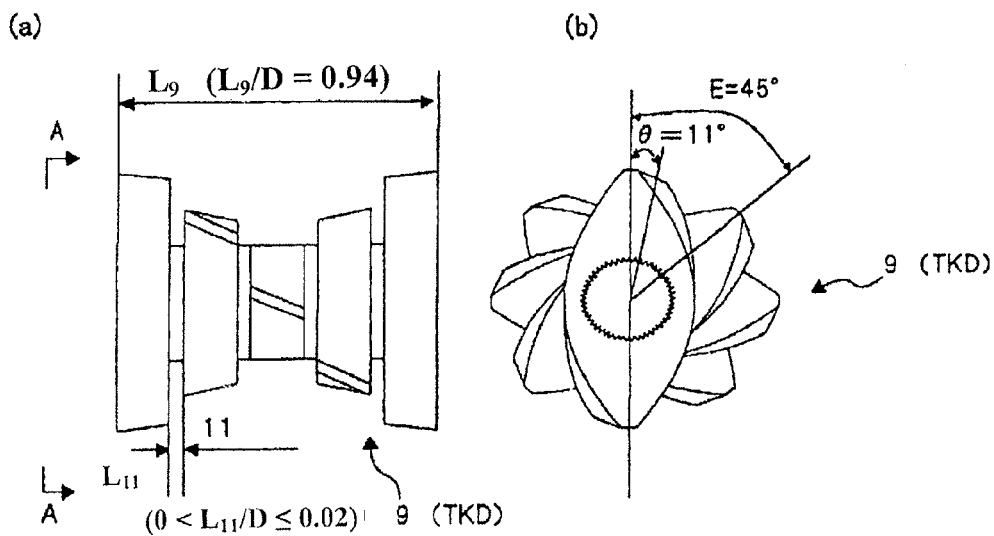
FIGS. 9(a) and 9(b) are views showing a surface renewable screw (TKD) used for Screw-3 to Screw-5.

Screw-3 shown in FIG. 5 has a screw configuration including the surface renewable screw segment 9 of the invention in the devolatilization region 16. In Screw-3, a surface renewable screw segment 9 (TKD) with a spiral angle θ=11° and a phase angle E=45° is arranged in the surface renewal region 18 immediately downstream of the kneading portion 17a2 of the upstream seal portion 17a. The surface renewable screw segment 9 (TKD) used in Screw-3 is shown in FIGS. 9(a) and 9(b). FIG. 9(a) is a side view of the surface renewable screw segment 9 (TKD), and FIG. 9(b) is a sectional view of the surface renewable screw segment 9 (TKD) in the direction of a line A-A shown in FIG. 9(*a*).

In Screw-3, three surface renewable screw segments 9 (TKD) are arranged so as to be continuously connected together. For this reason, as for the total length of the extruder, the extruder extends by 3.5 D of the configuration of Screw-1.

(Screw-4)

Figure 6:
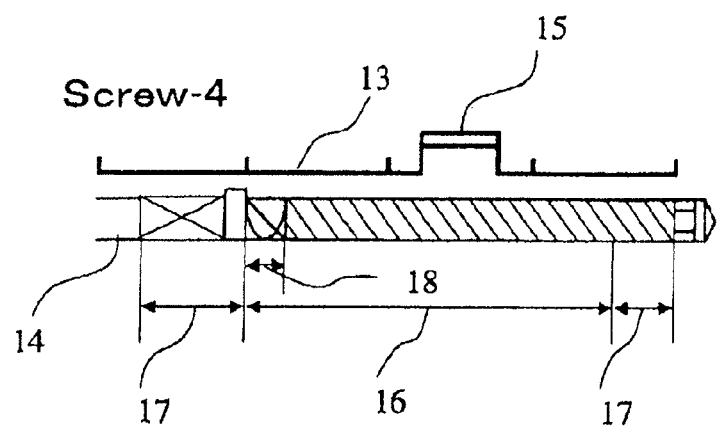
FIG. 6 is a schematic view showing the configuration of Screw-4 used for a devolatilization performance test.

The Screw-4 shown in FIG. 6 is configured such that only one surface renewable screw segment 9 (TKD) shown in FIG. 9(*a*) is arranged in the surface renewal region 18 immediately downstream of the kneading portion 17*a*2. As for the total length of the extruder, the extruder extends by 3.5 D of the configuration of Screw-1.

(Screw-5)

Figure 7:
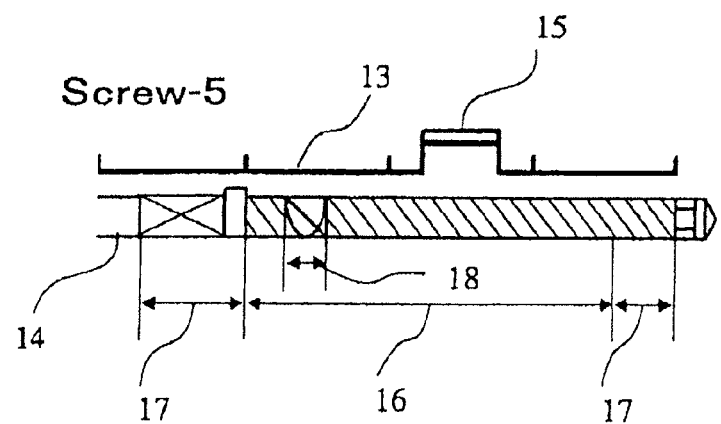
FIG. 7 is a schematic view showing the configuration of Screw-5 used for a devolatilization performance test.

Screw-5 shown in FIG. 7 is the same as Screw-4 in that Screw-5 has only one surface renewable screw segment 9 (TKD) shown in FIG. 9(*a*). However, there is a difference in that Screw-4 is configured such that the surface renewal region 18 in which the surface renewable screw segment 9 (TKD) is provided is immediately downstream of the kneading portion 17*a*2, whereas Screw-5 is configured such that a screw with transport capacity is arranged between the kneading portion 17*a*2 and the surface renewal region 18.

(Test Results)

Figure 10:
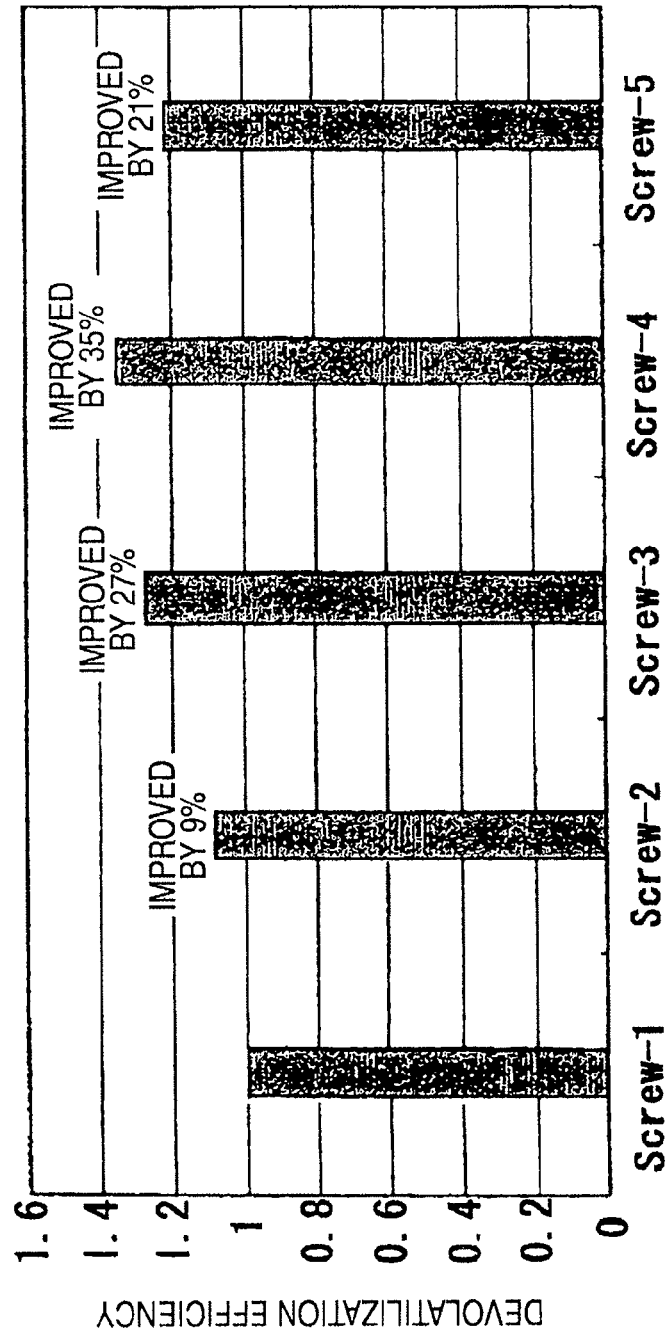
FIG. 10 is a graph showing results of the devolatilization performance tests performed using Screw-1 to Screw-5.
Figure 11:
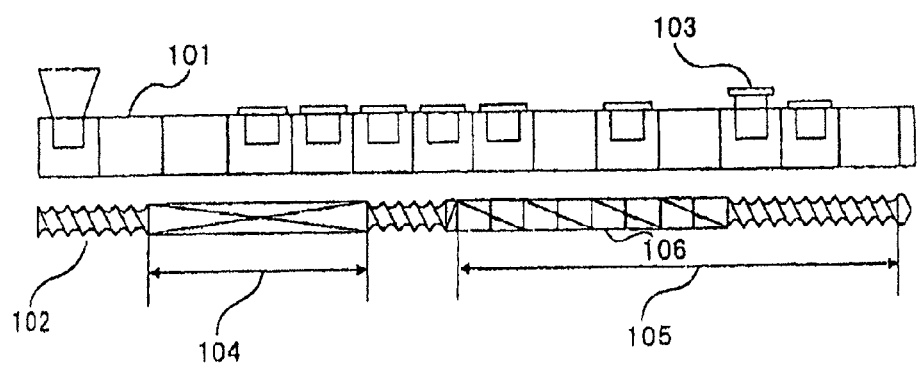
FIG. 11 is a schematic view of the configuration of an example of a related-art melting kneading devolatilizing extruder.
Figure 12:
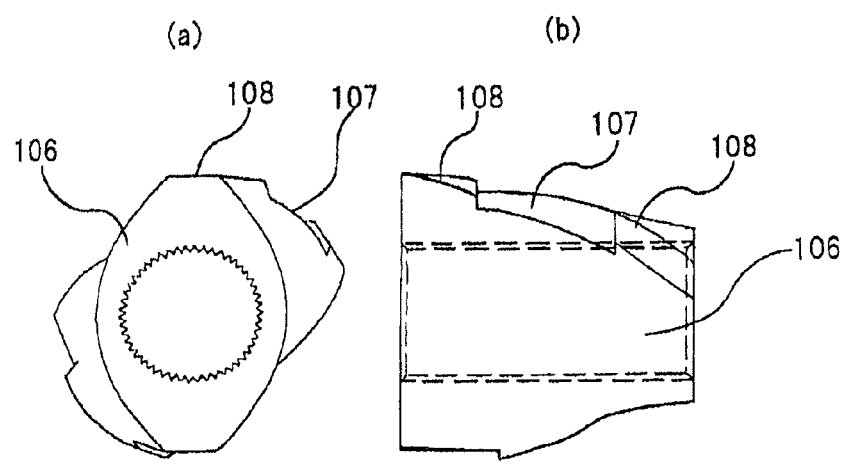
FIGS. 12(a) and 12(b) are a front view and a side view of a screw segment used for the melting kneading devolatilizing extruder shown in FIG. 11.

FIG. 10 is a graph showing results of the devolatilization performance tests performed using Screw-1 to Screw-5.

Here, devolatilization performance was defined as the ratio of devolatilization rate in each screw shape when the devolatilization rate of Screw-1 serving as one example of a general screw shape is set to 1. The devolatilization rate (%) is set to 100% (1−Cout/Cin). Incidentally, Cout is the concentration of a volatile component contained in the resin raw material discharged from the extruder, and Cin is the concentration of a volatile component contained in the resin raw material before being supplied to the extruder.

In the shape of Screw-2 using FK having the phase angle E between the discs 10, the devolatilization performance was improved by 9% compared with the shape of Screw-1. On the other hand, in Screw-3 using TKD having the spiral angle θ in each disc 10, superfluous stagnation in the surface renewable screw segment 9 was suppressed. Thus, the devolatilization performance was improved by 27% compared with the shape of Screw-1.

Additionally, in Screw-4 in which the number of TKDs is reduced, the devolatilization performance was improved by 35% compared with Screw-1. That is, in the surface renewable screw segment 9 of the invention, sufficient devolatilization performance is obtained with a small number of TKDs. Therefore, the devolatilization region can be prevented from becoming long unlike in other known techniques.

When Screw-4 is compared with Screw-5, it becomes apparent that, since Screw-4 has a 14% higher devolatilization performance, the devolatilization performance is improved by arranging the surface renewable screw segment 9 immediately after the kneading portion 17*a*2.

Although the invention has been described in detail with reference to the specific embodiment, it is clear to those skilled in the art that various alterations and modifications can be made without departing from the spirit and scope of the invention.

The present application claims the benefit of Japanese Patent Application (Patent Application No. 2007-179453, filed Jul. 9, 2007, the disclosure of which is incorporated herein by reference.

The invention claimed is:

1. A melting kneading devolatilizing extruder, comprising:
a cylinder;
two screws rotatably inserted into a bore of the cylinder,
wherein each screw is configured to receive resin raw material supplied from outside the cylinder to an upstream portion of the screw, to knead and to devolatilize the resin raw material at a region of the screw that is downstream from the upstream portion, and to convey the resin raw material to a downstream portion,
wherein the screw comprises at least one surface renewable screw segment, each of which includes a plurality of discs that are arrayed such that a phase angle E, which is a deviation angle between the discs around an axis of the screw, is 0°<E<90°, and
wherein the surface renewable screw segment comprises void portions disposed between the discs so that the discs are arranged at intervals in a direction of the axis of the screw and spaced apart from each other due to the void portions interposed between adjacent ones of the discs, where each of the void portions is a ring-shaped member having an external diameter equal to or less than a short diameter of the discs, and
wherein the void portion of the surface renewable segment has a ratio of 0<L/D≤0.02, where L is the length of an individual one of the void portions and D is the diameter of the cylinder bore;
the screw includes an upstream seal portion; and
a vent is provided for reducing a pressure in the cylinder,
wherein the upstream seal portion, the surface renewable segment and the vent are arranged in this order from the upstream portion to the downstream portion of the screw.

2. The melting kneading devolatilizing extruder according to claim 1,
wherein an outer peripheral surface of the void portion is parallel to an inner peripheral surface of the cylinder.

3. The melting kneading devolatilizing extruder according to claim 1,
wherein a spiral angle θ, which is an angle between a first top on the side of a front face of the disc and a second top on the side of a rear face of the disc at a tip portion that is a tip portion of the disc, is within a range of 0°≤θ<90° in an anti-rotational direction of the screw 14 when a cross-section of the disc having the axis of the screw as a normal line is seen in a direction of an axial tip.

4. The melting kneading devolatilizing extruder according to claim 1,
wherein the upstream seal portion comprises a kneading screw segment and a seal ring in order to knead the resin raw material, to raise the temperature of the resin raw material, and to form a resin seal,
the vacuum vent is configured to reduce the pressure in the cylinder to a negative pressure state and
wherein the surface renewable screw segment is arranged immediately after the upstream portion along the axis of the screw, in a portion of the cylinder which undergoes the negative pressure to devolatilize the resin raw material.

5. The melting kneading devolatilizing extruder according to claim 1, wherein a kneading region is provided upstream of the vent.

6. A melting kneading devolatilizing extruder that includes a devolatilizing portion, comprising:
a cylinder having a cylinder bore;

a screw rotatably disposed within the cylinder bore, having a longitudinal axis and configured to knead and convey resin raw material along a longitudinal length of the extruder;

a plurality of kneading discs arranged along a portion of the longitudinal axis of the screw that is disposed in the devolatilizing portion of the extruder, wherein each of the kneading discs comprises a short diameter and a long diameter; and a plurality of void portions disposed between the discs so that the discs are arranged at intervals in a direction of the longitudinal axis of the screw and spaced apart from each other due to the void portions interposed between adjacent ones of the discs, wherein each of the void portions is a ring-shaped member having an external diameter less than or equal to the short diameter of the two adjacent ones of the discs, and wherein the void portion has a ratio of $0 < L/D \leq 0.02$, where L is the length of an individual one of the void portions and D is the diameter of the cylinder bore;

the screw includes an upstream seal portion; and a vent is provided for reducing a pressure in the cylinder, wherein the upstream seal portion, the surface renewable segment and the vent are arranged in this order from the upstream portion to the downstream portion of the screw.

* * * * *